(12) United States Patent　　　　　　(10) Patent No.:　US 12,679,040 B2

Mourad et al.　　　　　　　　　　　　　(45) Date of Patent:　　Jul. 14, 2026

(54) APPARATUS WITH A THERMOPLASTIC TUBE TO TUBE-SHEET JOINT AND ASSOCIATED FRICTION STIR BASED FABRICATION METHOD

(71) Applicant: United Arab Emirates University, Al Ain (AE)

(72) Inventors: Abdel-Hamid Ismail Mourad, Al Ain (AE); Syed Haris Iftikhar, Al Ain (AE); Dinu Thomas Thekkuden, Al Ain (AE); Nizamudeen Alungal Cherupurakal, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 18/127,358

(22) Filed: Mar. 28, 2023

(65) Prior Publication Data

US 2024/0326344 A1　　Oct. 3, 2024

(51) Int. Cl.
B29C 65/06　　　　(2006.01)
B29C 65/00　　　　(2006.01)

(52) U.S. Cl.
CPC ........ B29C 65/069 (2013.01); B29C 65/0681 (2013.01); B29C 66/474 (2013.01); B29C 66/81425 (2013.01); B29C 66/81451 (2013.01)

(58) Field of Classification Search
CPC . B29C 65/069; B29C 65/0681; B29C 66/474; B29C 66/81425; B29C 66/81451;
(Continued)

(56) References Cited

U.S. PATENT DOCUMENTS 3,260,410 A　*　7/1966　Brandt ................... B29D 23/20
　　　　　　　　　　　　　　　　222/107
3,506,519 A　*　4/1970　Blumenkranz ..... B29C 66/1222
　　　　　　　　　　　　　　　　219/544
(Continued)

FOREIGN PATENT DOCUMENTS

CN　　　112122865 A　*　12/2020　............. B23K 37/00
JP　　　2002248582 A　*　9/2002
JP　　　2003334671 A　*　11/2003

OTHER PUBLICATIONS

C. T'Joen, "A review on polymer heat exchanges for HVAC&R applications" Journal, 2009, 763-779, vol. 32, International Journal of Refrigeration.
(Continued)

*Primary Examiner* — Abbas Rashid
*Assistant Examiner* — Caroline Beha
(74) *Attorney, Agent, or Firm* — Hayes Soloway PC

(57)　　　　　　ABSTRACT

An apparatus and method of manufacturing a thermoplastic tube-to-tube-sheet joint is disclosed. The method provides at least one tube-sheet having a first aperture and a plurality of holes. Further, the at least one tube-sheet fixes into a welding fixture using a plurality of bolts through the holes. The welding fixture has a second aperture. The method inserts a tubular member within the first aperture and the second aperture and fills an adequate molten workpiece material, using an FSW process, in a clearance gap between the tubular member and the at least one tube-sheet. The apparatus includes at least one tube-sheet having a first aperture, a welding fixture having a second aperture, a tubular member inserted into the at least one tube-sheet, and an adequate molten workpiece material, using the FSW process, is filled in a clearance gap between the tubular member and the at least one tube-sheet.

9 Claims, 6 Drawing Sheets

(58) Field of Classification Search
CPC .............. B29C 66/53465; B29C 65/18; B29C
65/8215; B29C 66/71; B29C 66/721;
B29C 66/7212; B29C 65/7844; B29C
66/112; B29C 66/114; B29C 66/81429;
B29C 66/8322; B29C 66/73921; F28F
9/187; F28F 21/062; F28F 2275/062;
B29L 2031/18
See application file for complete search history.

(56) References Cited

U.S. PATENT DOCUMENTS

| | | | | |
|---|---|---|---|---|
| 4,016,078 A | * | 4/1977 | Clark | B01D 65/00 |
| | | | | 210/94 |
| 4,916,282 A | * | 4/1990 | Chamming's | F22B 37/003 |
| | | | | 219/69.15 |
| 5,460,317 A | | 10/1995 | Thomas | |
| 6,206,268 B1 | * | 3/2001 | Mahoney | B23K 20/1255 |
| | | | | 228/2.1 |
| 6,811,632 B2 | | 11/2004 | Nelson | |
| 2003/0035635 A1 | * | 2/2003 | Chastain | G02B 6/4401 |
| | | | | 385/103 |
| 2006/0124691 A1 | * | 6/2006 | Wood | B23K 20/1265 |
| | | | | 228/2.1 |
| 2011/0000952 A1 | * | 1/2011 | Takeshita | B23K 20/122 |
| | | | | 228/159 |
| 2012/0199331 A1 | * | 8/2012 | Maurer | F28D 7/024 |
| | | | | 165/172 |
| 2013/0112736 A1 | * | 5/2013 | Kato | B23K 20/125 |
| | | | | 228/2.1 |
| 2016/0202001 A1 | * | 7/2016 | Eller | B23K 20/122 |
| | | | | 165/157 |
| 2017/0227289 A1 | * | 8/2017 | Shea | F27B 3/20 |
| 2020/0338665 A1 | * | 10/2020 | Odievre | B23K 20/2336 |

OTHER PUBLICATIONS

D. C. Deisenroth, "Review of heat exchangers enabled by polymer and polymer composite additive manufacturing," Journal, 2018, vol. 39, No. 19, pp. 1652-1668, Heat Transf. Eng.
A. R. J. Hussain, "Review of polymers for heat exchanger applications: Factors concerning thermal conductivity," Journal, 2017, vol. 113. Pergamon, pp. 1118-1127, Applied Thermal Engineering.
S. Inaniwa, "Application of friction stir welding for several plastic materials," Journal, Proceedings of the 1st International Joint Symposium on Joining and Welding, Elsevier, 2013, pp. 137-142.
A.H.I Mourad, "Study on the mechanical behavior of aluminum alloy 5083 friction stir welded joint," Article, ASME Pressure Vessels and Piping Conference, 2014, vol. 6A, pp. 1-7.
I. Sabry, "Friction stir welding of T-joints: Experimental and statistical analysis,", Journal, J. Manuf. Mater. Process., vol. 3, No. 2, pp. 1-23, May 2019.
A. M. El-Kassas, "Characteristics of potential sources—vertical force, torque and current on penetration depth for quality assessment in friction stir welding of AA 6061 pipes," Journal, Int. Rev. Aerosp. Eng., vol. 12, No. 4, pp. 195-204, 2019.
Y. Bozkurt, The optimization of friction stir welding process parameters to achieve maximum tensile strength in polyethylene sheets, Journal, Mater. Des., vol. 35, pp. 440-445, Mar. 2012.
E. Azarsa, "Experimental investigation on flexural behavior of friction stir welded high density polyethylene sheets," Journal, J. Manuf. Process., vol. 16, pp. 149-155, Jan. 2014.

* cited by examiner

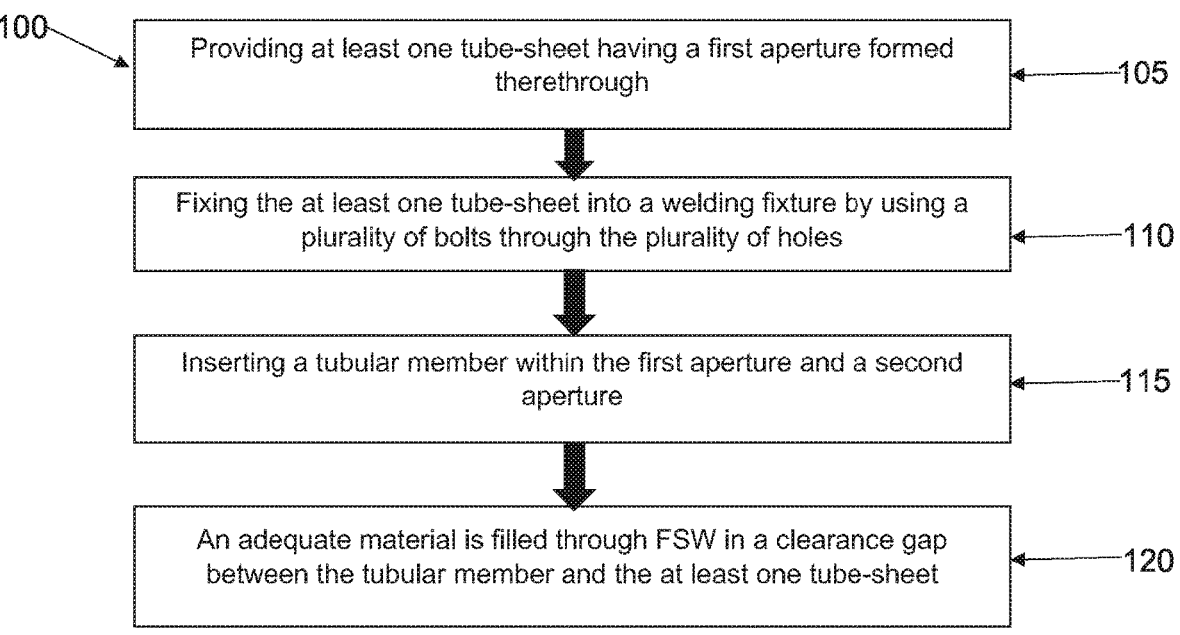
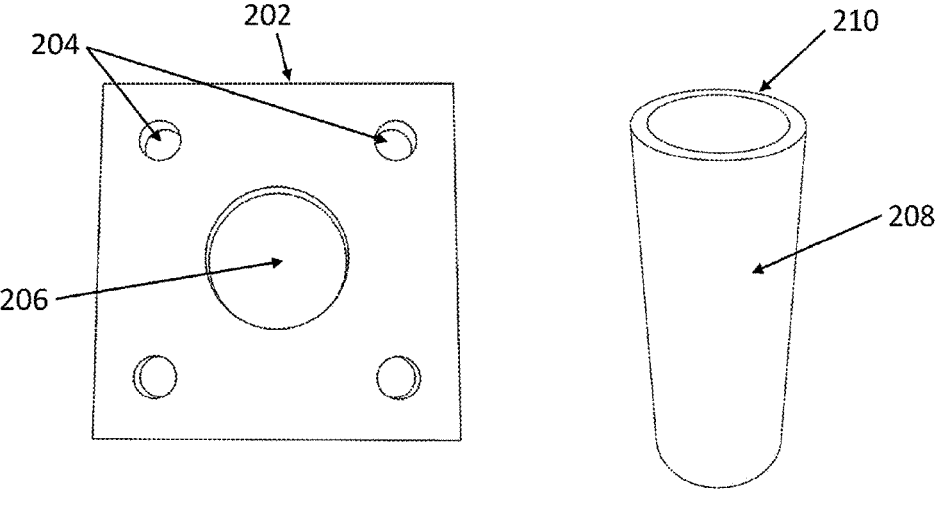
FIG. 1
FIG. 2A                    FIG. 2B

300

302

306

204

208

304

202

402

204

202

304

Plunging
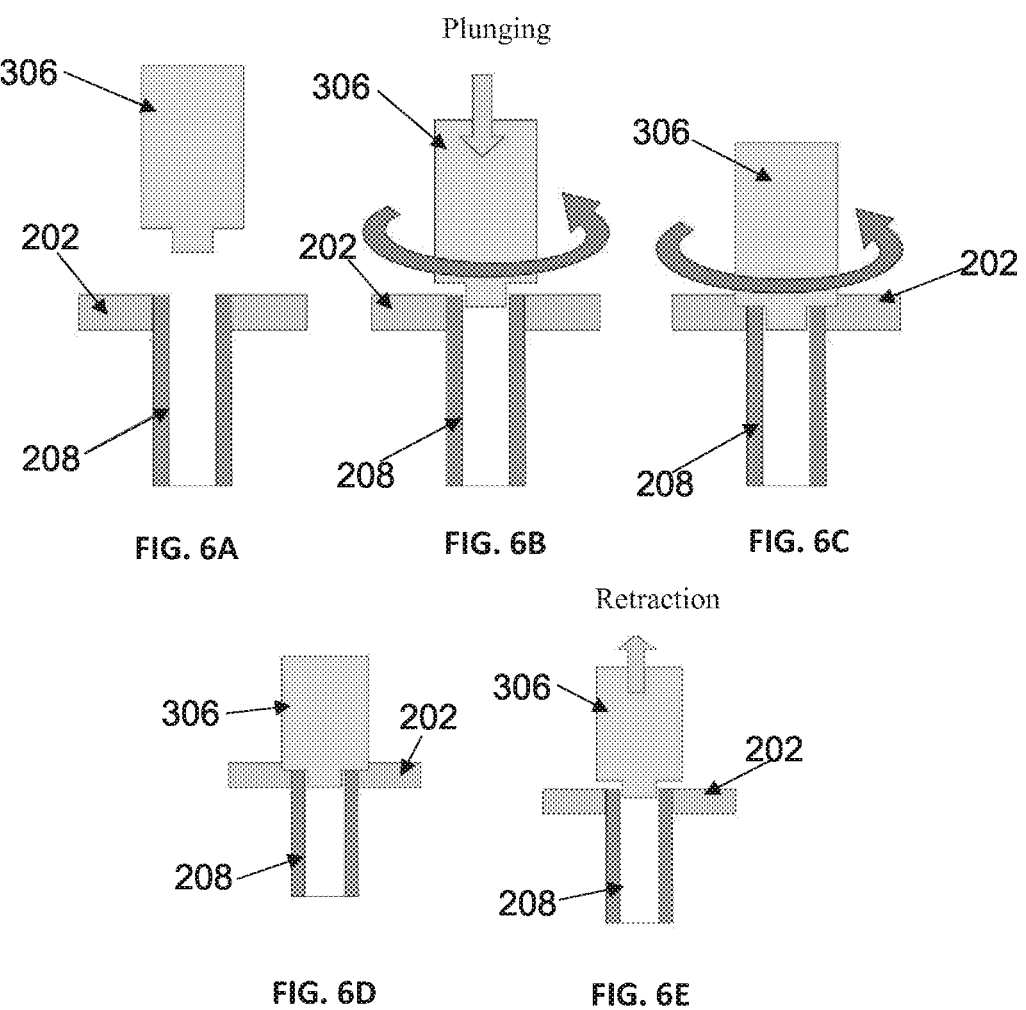
FIG. 6A                    FIG. 6B                    FIG. 6C
Retraction
FIG. 6D                    FIG. 6E
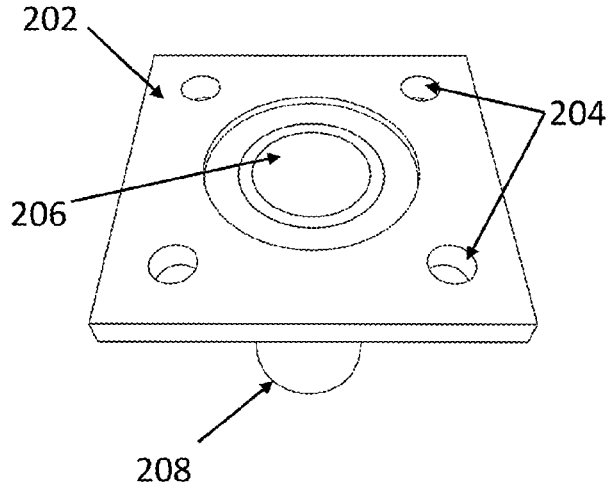
FIG. 7

800

208

APPARATUS WITH A THERMOPLASTIC TUBE TO TUBE-SHEET JOINT AND ASSOCIATED FRICTION STIR BASED FABRICATION METHOD

FIELD OF THE INVENTION

Embodiments of the present invention relate to the field of friction stir welding and more particularly to an apparatus with a thermoplastic tube to tube-sheet joint and a method of fabricating the tube to tube-sheet joint.

BACKGROUND OF THE INVENTION

A thermoplastic material is joined by using several traditional joining methods. They include adhesive joining techniques, mechanical fastening techniques, and welding techniques.

The adhesive joining method has many limitations for joining thermoplastics. This method requires cleaning of workpiece surfaces and joint preparations, has handling problems, and has slow curing which causes longer production times. Also, the developed adhesive joint is sensitive to environmental conditions. The adhesives may also chemically degrade the part surfaces.

The mechanical fastening methods use metallic fasteners for joining thermoplastics. The use of these metallic fasteners increases the product weight and is also prone to corrosion. Also, the developed joint is not leak-proof and may also have stress concentrations.

Apart from the above limitations, the development of shell-and-tube heat exchanger applications for highly corrosive environments requires a joining technique that forms the joint from a workpiece (a tubular member, and a tube-sheet) base materials. Based on a specific corrosive fluid, a specific thermoplastic material is selected because of its tolerance to the selected fluid. This further necessitates the development of the joint from the same thermoplastic materials to be able to tolerate the highly corrosive fluid.

The welding methods have the capability to develop thermoplastic tube-to-tube-sheet joints (TTJs) using the workpiece base thermoplastic material. However, excessive heating during conventional welding methods may cause thermal degradation in the resulting joint.

In traditional fusion welding methods (like extrusion welding), the major drawback is the formation of weld joints with low leak paths.

Another example is U.S. Pat. No. 7,347,351B2 discloses an apparatus and a system for unitized friction stir welded structures and associated method. An assembly includes an engaging structure and at least one tooling block capable of engaging the engaging structure, as well as a substructure positioned adjacent to the engaging structure and the tooling block. The substructure and engaging structure capable of being friction stir welded together to form a butt joint therebetween.

Because of the above limitations and drawbacks, it is necessary to use a friction stir welding (FSW) process for a tube to tube-sheet joints, that is a relatively novel technique that provides low and controlled heating with an addition of mechanical stirring during the FSW process and provides high-quality joints. The FSW process has the ability to form spot and continuous joints, provides high-strength welds, consumes low energy, has less process durations, has low-cost machines required, requires no pre-welding part preparations, and no consumable materials required.

However, when the tube-to-tube-sheet joint (TTJs) using the proposed technique has been compared to the traditional methods used for joining thermoplastics, it is found that the proposed method provided more strength and a high leak path. The high leak path for thermoplastic heat exchangers is important for highly corrosive fluids like acids because the mixing of the highly corrosive fluid with the other fluid (like water) is catastrophic. A high leak path for TTJs, as developed by the proposed FSW-based process, has never been achieved before using any of the traditional joining techniques.

OBJECTS OF THE INVENTION

The principal object of the present invention is to overcome the disadvantage of the prior art.

Another object of the present invention is to provide a novel innovative welding process i.e. a friction stir tube-to-tube-sheet welding (FSTTW), for joining a thermoplastic tube and tube-sheet in an apparatus (like a shell and tube heat exchangers).

Another object of the present invention is to provide a welding tool (an FSW (friction stir welding) tool) that is designed solely for the tubular member and the at least one tube-sheet interactions, which further simplifies the welding process for this challenging joint geometry.

Another object of the present invention is to provide a tool guide that is designed on top of a tool shoulder for centering the welding tool that helps in plunging the welding tool into a workpiece (the tubular member and the at least one tube-sheet) to a specified depth.

Another object of the present invention is to provide a method that uses an adequate material to fill in a clearance gap between the tubular member and the at least one tube-sheet for successfully sealing the joint with a high leak path.

Another object of the present invention is to provide the method of fabricating the tube to tube-sheet joint which provides high-strength welds, consumes low energy, has less process durations, has low-cost machines required, requires no pre-welding part preparations, and no consumable materials required.

Another object of the present invention is to provide the method of fabricating the tube-to-tube-sheet joint with a good aesthetical appearance with less weld flash, thus, no post-welding cleaning operations are required.

Another object of the present invention is to provide the method of fabricating the tube to tube-sheet joint that uses the adequate workpiece material (thermoplastic polymer-based composites with metallic, ceramic or carbon-based fillers for enhanced thermal conductivity) for enhanced overall thermal transport performance of thermoplastic heat exchangers.

Another object of the present invention is to provide the method of fabricating the tube to tube-sheet joint using adequate workpiece material (thermoplastic polymer-based composites with metallic, ceramic or carbon-based fillers for enhanced thermal conductivity), that enhances the frictional heat generation due to presence of fillers and also enhances heat conduction of this frictional heat to the root of the weld joint because of the improved thermal conductivity.

Another object of the present invention is to provide an easy and efficient method of fabricating the tube-to-tube-sheet joint.

SUMMARY OF THE INVENTION

An embodiment of the present disclosure relates to an apparatus with a thermoplastic tube to tube-sheet joint and associated friction stir-based fabrication method.

In one general aspect, the method of fabricating the tube to tube-sheet joint (TTJ) includes at least one tube-sheet, a vertical milling machine, a welding fixture, a welding tool, and a tubular member. Other embodiments of this aspect include corresponding architecture, apparatus, and computer programs recorded on one or more storage devices, each configured to perform the actions of the methods.

In accordance with an embodiment of the present invention, in the first step, the method provides the at least one tube-sheet having a first aperture. Further, the at least one tube-sheet includes a plurality of holes. In the next step, at least one tube-sheet is fixed into the welding fixture by using a plurality of bolts through the plurality of holes, and further the welding fixture is clamped onto the vertical milling machine bed. Further, the welding fixture has a second aperture. In the further step, the tubular member is inserted within the first aperture and the second aperture. In the last step, the adequate material is filled in a clearance gap between the tubular member and the at least one tube-sheet by the rotation and plunging of the welding tool facilitated by the vertical milling machine.

In accordance with an embodiment of the present invention, the tubular member and the at least one tube-sheet are made of a carbon black reinforced high-density polyethylene. Further, the adequate material is anyone of a thermoplastic material.

In accordance with an embodiment of the present invention, the tube to tube-sheet joint configuration is done for a thermoplastic material that is a carbon black reinforced high-density polyethylene. Further, the at least one tube-sheet and the tubular member are also known as a workpiece.

In accordance with an embodiment of the present invention, a friction stir welding process is used for joining the workpieces via the vertical milling machine. Further, multiple steps are used for the friction stir welding (FSW) process. In the first step, the rotating welding tool is plunged into the workpieces to a specified depth. The plunging of the welding tool creates frictional heat along with plunging pressure for the proper joining of the workpieces. In the next step, a required plunge depth is achieved, and the welding tool rotates at the required plunge depth for a specific time period. In the next step, the rotation of the welding tool is stopped when the specific time period is over, and the welding tool is kept at the required plunge depth for a specific time duration. In the last step, the welding tool is retracted from the workpieces when the specific time duration is over to get an end result, wherein the end result is the tube-to-tube-sheet joint.

In accordance with an embodiment of the present invention, the specified depth, the specific time period, and the specific time duration is a plunging depth, a dwell time and a waiting time respectively.

In accordance with an embodiment of the present invention, the FSW process form spot and continuous joints, provides high strength welds, consumes low energy, has less process durations, has low-cost machines required, requires no pre-welding part preparations, and no consumable materials required.

In accordance with an embodiment of the present invention, the welding tool is a friction stir welding (FSW) tool that is fabricated by a H13 steel and includes a tool guide and a tool shoulder.

In accordance with an embodiment of the present invention, the first aperture of the at least one tube-sheet is placed just above the second aperture of the welding fixture. Further, the second aperture of the welding fixture is slightly less (interference fit) than a tubular member's outer diameter for holding the tubular member stationary during the FSW process.

In accordance with an embodiment of the present invention, the fabricated tube to tube-sheet joint is used in many apparatuses that is any one of a heat exchanger, a thermoplastic shell and tube heat exchanger, a thermoplastic pipe to flange joints, and a boiler.

In accordance with an embodiment of the present invention, the method provides low and controlled heating with an addition of mechanical stirring during the FSW process and provides high quality joints, high strength, and high leak path.

In accordance with another embodiment of the present invention, the apparatus with the tube to tube-sheet joint includes system further include at least one tube-sheet, a welding fixture, and a tubular member.

In accordance with an embodiment of the present invention, the at least one tube-sheet having a first aperture. Further, the at least one tube-sheet includes a plurality of holes. The welding fixture has a second aperture formed therethrough. Further, the at least one tube-sheet is fixed into the welding fixture by using a plurality of bolts through the plurality of holes. Further, the tubular member is inserted within the first aperture and the second aperture. Further, the adequate material is filled in a clearance gap between the tubular member and the at least one tube-sheet.

In accordance with an embodiment of the present invention, the apparatus is selected from the group consisting of a heat exchanger, a thermoplastic shell and tube heat exchanger, a thermoplastic pipe to flange joints, and a boiler.

In accordance with an embodiment of the present invention, the welding tool is a friction stir welding (FSW) tool that is fabricated by a H13 steel and includes a tool guide and a tool shoulder.

In accordance with an embodiment of the present invention, the tubular member and the at least one tube-sheet are made of a carbon black reinforced high-density polyethylene. Further, the adequate material is any thermoplastic material.

These and other objects, embodiments and advantages of the present disclosure will become readily apparent to those skilled in the art from the following detailed description of the embodiments having reference to the attached figures, the disclosure not being limited to any particular embodiments disclosed.

BRIEF DESCRIPTION OF THE DRAWINGS

So that the manner in which the above recited features of the present invention is be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a block diagram 100 illustrating a method of fabricating a tube to tube-sheet joint, according to an embodiment of the present invention.

FIGS. 2A and 2B show a structure of at least one tube-sheet 202 and a tubular member 208, according to an embodiment of the present invention.

FIGS. 6A, 6B, 6C, 6D and 6E show the steps used during the development of the thermoplastic TTJs using the FSW process, according to an embodiment of the present invention.

FIG. 7 show an end result, according to an embodiment of the present invention.

DETAILED DESCRIPTION

Figure 3:
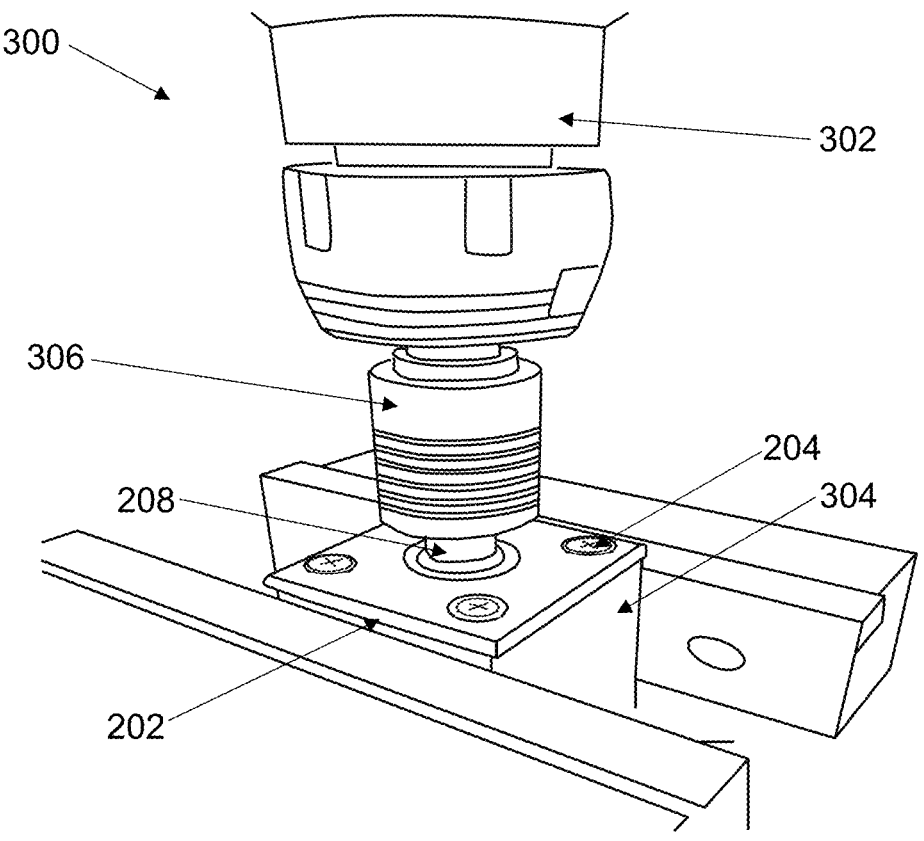
FIG. 3 shows a welding setup 300 for performing a friction stir welding (FSW) process, according to an embodiment of the present invention.

The present invention relates to an apparatus with a thermoplastic tube to tube-sheet joint and associated friction stir-based joining method. The joining of polymeric materials in the tube-to-tube-sheet joint configuration is useful in many apparatuses like a thermoplastic-based shell-and-tube heat exchangers, and a thermoplastic piping application in the form of thermoplastic pipe-to-flange joints.

Embodiments of the present disclosure will be described more fully hereinafter with reference to the accompanying drawings in which, like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred systems and methods are now described.

Terms a tubular member and a tube may be used interchangeably.

Terms a tube to tube-sheet joint (TTJ) and a thermoplastic tube to tube-sheet joint (TTJ) may be used interchangeably.

FIG. 1 is a block diagram 100 illustrating the method of fabricating the tube to tube-sheet joint, according to an embodiment of the present invention. The method of fabricating the tube to tube-sheet joint (TTJ) include at least one tube-sheet 202, a vertical milling machine 302, a welding fixture 304, a welding tool 306, a tubular member 208. Other embodiments of this aspect include corresponding architecture, apparatus, and computer programs recorded on one or more storage devices, each configured to perform the actions of the methods.

In accordance with an embodiment of the present invention, the method provides the at least one tube-sheet 202 has a first aperture 206, as shown in step 105. Further, the at least one tube-sheet 202 includes a plurality of holes 204. Further, the at least one tube-sheet 202 is fixed into the welding fixture 304 by using a plurality of bolts through the plurality of holes 204, and further the welding fixture is clamped onto the vertical milling machine 302, as shown in step 110. Further, the welding fixture 304 has a second aperture 402. The tubular member 208 is inserted within the first aperture 206 and the second aperture 402, as shown in step 115. In the last step, the adequate material is filled in a clearance gap between the tubular member 208 and the at least one tube-sheet 202 by the friction stir welding (FSW) process using the welding tool 306 facilitated by the vertical milling machine 302, as shown in 120.

In accordance with an embodiment of the present invention, the adequate material is anyone thermoplastic material. FIGS. 2A and 2B shows a structure of the at least one tube-sheet 202 and the tubular member 208, according to an embodiment of the present invention. Further, the tubular member 208 and the at least one tube-sheet 202 are made of a carbon black reinforced high-density polyethylene.

In accordance with an embodiment of the present invention, a thickness of the at least one tube-sheet 202 lies between 4 mm to 5 mm (millimeter), particularly 4.7 mm. Further, a cross-section is any one of a 40 mm×40 mm square, a 50 mm×50 mm square, and a 60 mm×60 mm square, more particularly the 50 mm×50 mm square cross-section. The diameter of the first aperture 206 lies between 21 mm to 22 mm, more particularly 21.1 mm (0.5 radial clearance with the tubular member).

In accordance with an embodiment of the present invention, an inner diameter of the tubular member 208 lies between 15 mm to 16 mm, more particularly, 15.9 mm. Further, an outer diameter 210 of the tubular member 208 lies between 21 mm to 22 mm, more particularly, 20.1 mm. Further, a length of the tubular member 208 is any one of 51.5 mm, 52 mm, and 52.2 mm in which 0, 0.5, and 1 mm are a tubular member protrusion.

FIG. 3 shows a welding setup 300 for performing a friction stir welding (FSW) process, according to an embodiment of the present invention. Further, the vertical milling machine 302 is used to perform the FSW process for joining a workpiece. Further, the at least one tube-sheet 202 and the tubular member 208 are also known as the workpiece.

In accordance with an embodiment of the present invention, the welding setup 300 include the welding fixture 304 and the welding tool 306 for performing the FSW (Friction Stir Welding) process.

Figure 4:
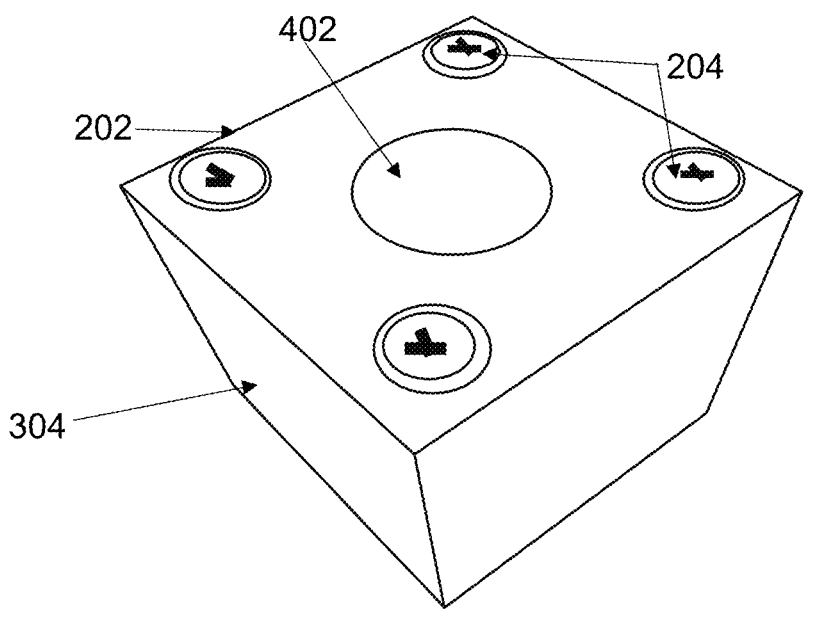
FIG. 4 shows a welding fixture 304, according to an embodiment of the present invention.

FIG. 4 shows the welding fixture 304, according to an embodiment of the present invention. The at least one tube-sheet 202 is fixed to the welding fixture 304 by using the plurality of holes 204 with help of the plurality of bolts. The plurality of bolts is any one of a screw, an anchor bolt, a blind screw, a carriage screw, among others, more particularly, the at least one tube-sheet 202 is fixed to the welding fixture 304 by using at least four screws 204.

In accordance with an embodiment of the present invention, the first aperture 206 of the at least one tube-sheet 202 is placed just above the second aperture 402 of the welding fixture 304. Further, the second aperture 402 of the welding fixture 304 is less than the tubular member's 208 outer diameter 210 for holding the tubular member 208 stationary during the FSW process.

Figure 5:
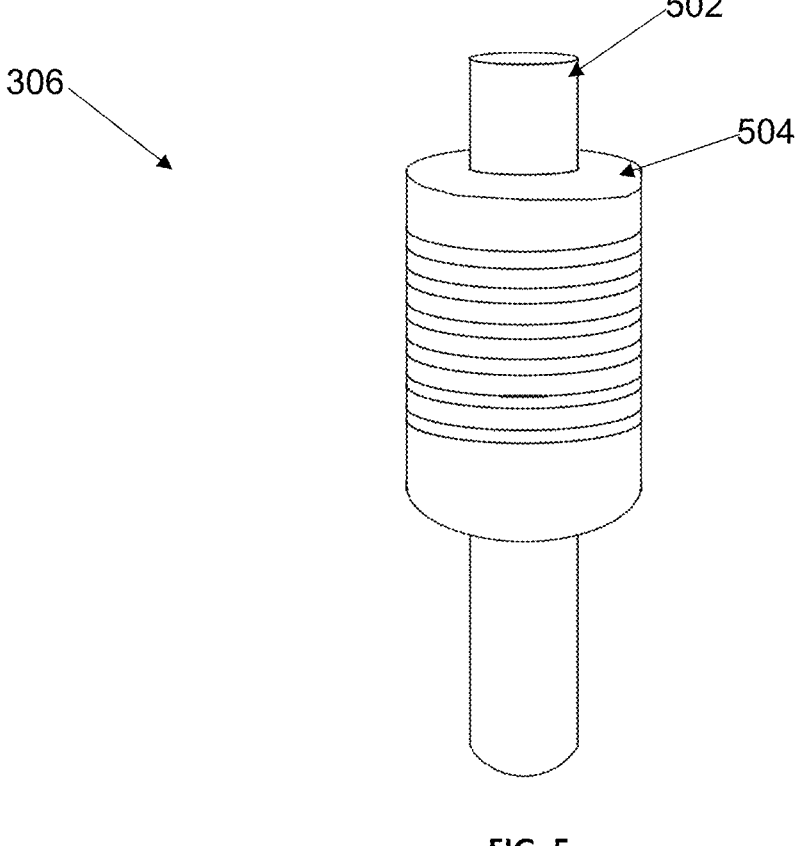
FIG. 5 shows a welding tool 306, according to an embodiment of the present invention.

FIG. 5 shows the welding tool 306, according to an embodiment of the present invention. The welding tool 306 dimensions are specifically designed to suit the dimensions of the workpiece materials.

In accordance with an embodiment of the present invention, the welding tool 306 is a friction stir welding (FSW) tool that is fabricated by a H13 steel and includes a tool guide 502 and a tool shoulder 504. Further, the tool guide 502 is designed on top of the tool shoulder 504 which helps in centering the welding tool 306 that helps in plunging the welding tool 306 into the workpiece (the tubular member 208 and the at least one tube-sheet 202) to a specified depth.

FIGS. 6A, 6B, 6C, 6D and 6E show the steps used during development of thermoplastic TTJs using the FSW process, according to an embodiment of the present invention.

In accordance with an embodiment of the present invention, the friction stir welding process is used for joining the workpieces (202, 208) via the vertical milling machine 302. Further, multiple steps are used for the FSW process. The first step shows the instance just before the FSW process, as shown in FIG. 6A. In the second step, the welding tool 306 is plunged into the workpieces (202, 208) to a specified depth, as shown in FIG. 6B. The rotation and plunging of the welding tool 306 create frictional heat along with plunging pressure for the proper joining of the workpieces (202, 208). In the next step, a required plunge depth is achieved, and the welding tool 306 rotates at the required plunge depth for a specific time period, as shown in FIG. 6C. In the next step, the rotation of the welding tool 306 is stopped when the specific time period is over, and the welding tool 306 is kept at the required plunge depth for a specific time duration, as shown in FIG. 6D. In the last step, the welding tool 306 is retracted from the workpieces (202, 208) when the specific time duration is over to get an end result, wherein the end result is the tube-to-tube-sheet joint, as shown in FIG. 6E.

In accordance with an embodiment of the present invention, the specified depth, the specific time period, and the specific time duration is a plunging depth, a dwell time and a waiting time respectively.

FIG. 7 shows the end result, according to an embodiment of the present invention. The end results have a maximum strength at welding parameters that lies between 800 to 850 rpm rotational speed, 0.5 to 0.8 mm plunging depth, and 0.5 to 0.7 mm protrusion. More preferably, the end result maximum strength is 820 rpm rotational speed, 0.6 mm plunging depth, and 0.5 mm protrusion. All the welding cases visually are nearly the same as the process shown here, require less cleaning because of less flash, and look aesthetically good. The FSW process of tube-to-tube-sheet (complex shaped) made of any polymeric materials has not been achieved before.

In accordance with an embodiment of the present invention, the tube to tube-sheet joint configuration is done for a thermoplastic material that is a carbon black reinforced high-density polyethylene. In accordance with another embodiment of the present invention, the apparatus with the tube to tube-sheet joint includes system further include at least one tube-sheet 202, a welding fixture 304, and a tubular member 208.

In accordance with an embodiment of the present invention, the at least one tube-sheet 202 having a first aperture 206. Further, the at least one tube-sheet 202 includes a plurality of holes 204. The welding fixture 304 has a second aperture 402 formed therethrough. Further, the at least one tube-sheet 202 is fixed into the welding fixture 304 by using a plurality of bolts through the plurality of holes 204. Further, the tubular member 208 is inserted within the first aperture 206 and the second aperture 402. Further, the adequate molten workpiece material, as a result of the FSW process, is filled in a clearance gap between the tubular member 208 and the at least one tube-sheet 202. The frictional heat generated at the workpiece upper surface melts the polymeric workpiece material at the surface, and this molten workpiece material flows into the clearance gap between the tubular member and the tube sheet. Adequate material filling of the clearance gap means this flowing of the molten workpiece material in the clearance gap (there is no separate consumable material used for filling of the clearance gap).

In accordance with an embodiment of the present invention, the welding tool 306 is a friction stir welding (FSW) tool that is fabricated by a H13 steel and includes a tool guide 502 and a tool shoulder 504.

In accordance with an embodiment of the present invention, the apparatus is selected from the group consisting of a heat exchanger, a thermoplastic shell and tube heat exchanger, a thermoplastic pipe to flange joints, and a boiler.

In accordance with an embodiment of the present invention, the tubular member 208 and the at least one tube-sheet 202 are made of a carbon black reinforced high-density polyethylene. Further, the adequate material is any thermoplastic material (anyone of a metallic, a ceramic, or a carbon-based material). In an embodiment, the adequate workpiece materials are thermoplastic materials which include thermoplastic polymers and their composites (these composites can include metallic, ceramic, or carbon-based fillers), and there is no additional consumable material added during welding process.

In accordance with an exemplary embodiment of the present invention, the tube-to-tube-sheet joints in the shell and tube heat exchangers add structural integrity to the heat exchanger by withstanding the operating temperature and pressure in addition to the role of acting as a barrier in separating a tube-side and a shell-side transfer fluid. For these reasons, a tube pulls out strength of the tube-to-tube-sheet joint (TTJ) and a minimum leak path are important measures for evaluating the success of tube to tube-sheet joints. The minimum leak path is the minimum distance between the tube and shell side fluid often separated by the weld or fusion zone. An insufficient strength and inadequate minimum leak path cause heat exchanger failures resulting in high economic losses. So, the friction stir welding (FSW) process is applied to the thermoplastic heat exchanger applications for innovative joining of the tube to tube-sheet. In accordance with an advantageous embodiment of the present invention, the FSW process for fabricating tube-to-tube-sheet joints explicitly for thermoplastic heat exchangers is neither known nor commercialized. Further, when the fusion zone between the tubular member 208 and the at least one tube-sheet 202 joint is high then the minimum leak path is also high that resulting in the strength of the heat exchangers being also high.

In accordance with the above exemplary embodiment of the present invention, the at least one tube-sheet 202 material of 4.7 mm thickness and the tubular member 208 of 15.9 mm inner and 20.1 mm outer diameters 210 are used. FIG. 4 shows the welding fixture 304, and according to it, the at least one tube-sheet 202 material is cut into 50 mm×50 mm squares with the first aperture 206 of 21.1 mm (for 0.5 mm radial clearance). These square cuts are fixed to the welding fixture 304 using the at least four screws. The tubular member 208 is cut in lengths of 51.5, 52, and 52.5 mm (0, 0.5, and 1 mm protrusions).

The inner diameter of the second aperture 402 of the welding fixture 304 is made a bit less than the tubular member's 208 outer diameter 210 for holding the tubular member 210 stationary during the FSW process.

FIG. 5 shows the FSW tool 306 which is fabricated from the H13 steel. The whole welding setup 300 is shown in FIG. 3. Further, the vertical milling machine 302 is used to carry out the FSW process. The end result has maximum strength with 820 rpm (rotation per minute) rotational speed, 0.6 mm plunging depth, and 0.5 mm protrusion as shown in FIG. 7.

In accordance with another exemplary embodiment of the present invention, the effects of the rotational speed (RS), the plunging depth (PD), and the protrusion (PT) on a tube pull-out strength of the weld joints is measured. Three levels of all the three involved factors are used: RS=650, 820, 1600 rpm, PT=0, 0.5, 1 mm, PD=0.6, 0.8, 1 mm. Some of the remaining factors are kept constant: radial clearance of 0.5 mm (between tube and sheet), the dwell time of 10 s, and the waiting time of 10 s. A full factorial design (3×3=27 weld cases) is used for the FSW process.

Figure 8:
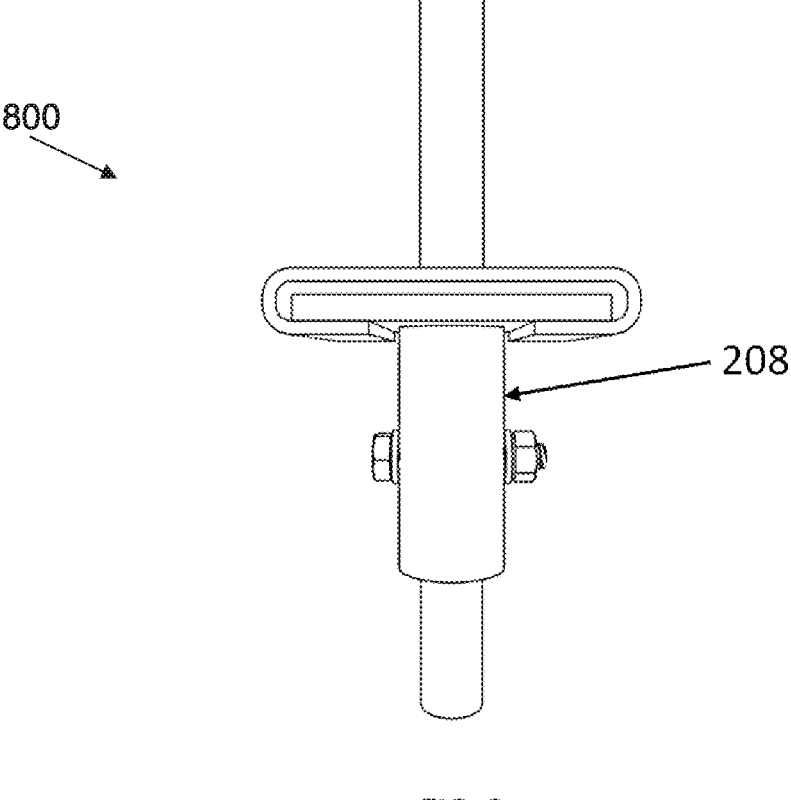
FIG. 8 is a test fixture 800 for a tube pull-out test, according to an exemplary embodiment of the present invention.

The values of the parameter levels and constant factors are fixed through the initial FSW experimentations that provided satisfactory results. Selected results of all the 27 weld cases have been examined here to discuss the feasibility of the FSW process for developing TTJ for thermoplastic materials with adequate strength and leak path. The strength of the joints is determined through tube pull-out tests on an universal testing machine at 5 mm/min crosshead speed. FIG. 8 is a test fixture 800 for the tube pull-out test, according to an exemplary embodiment of the present invention. The distance between the top of the sheet to the center of the drilled hole in the tubular member 208 is fixed to 30 mm length.

In accordance with another exemplary embodiment of the present invention, to assess the capability of the FSW process for thermoplastic TTJ, the strength of FSW process is compared with an adhesive joining (a traditional joining technique for thermoplastics) for preliminary comparisons. Several commercial adhesives are used, including an Alteco Superglue, an Araldite Rapid, a Loctite Epoxy Quickset, and a Weicon Epoxy Minute Adhesive.

The samples for adhesives joining are prepared in following order: methanol wipe, 320 grit sanding with sandpaper, cleaning with dry cloth, methanol wipe again, waiting for 20 mins for evaporation of methanol before applying the adhesive material. For all the adhesive cases, three replicates are produced.

Figures 9A, 9B:
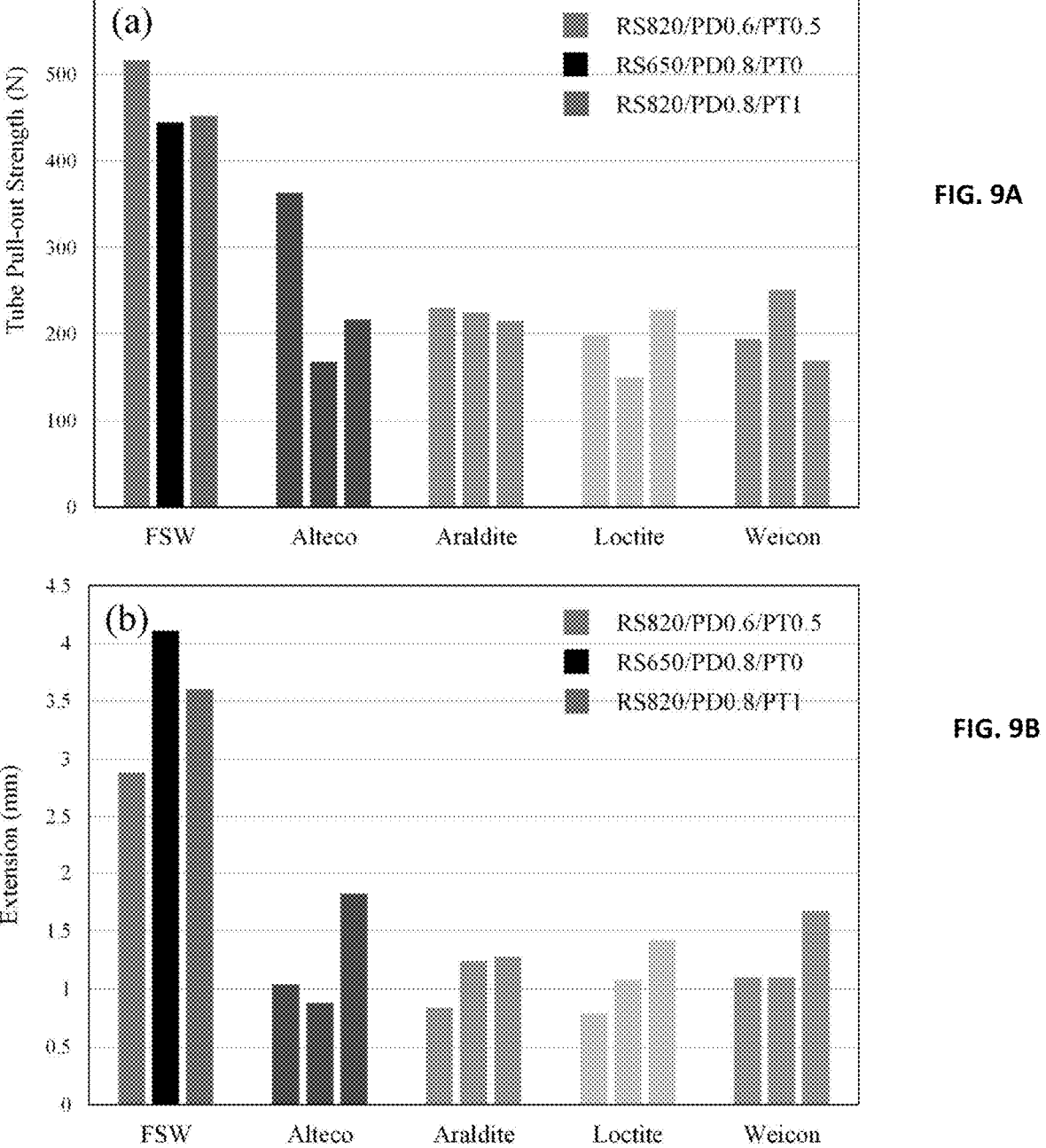
FIGS. 9A and 9B show the results obtained from the tube pull-out test of the TTJs developed using both the FSW process and an adhesive technique, according to another exemplary embodiment of the present invention.

FIGS. 9A and 9B show the results obtained from the tube pull-out test of the TTJs developed using both the FSW process and the adhesive techniques, according to another exemplary embodiment of the present invention. Three FSW process cases are provided that have very high strengths: RS820/PD0.6/PT0.5 (517 N), RS820/PD0.8/PT1 (452 N), and RS650/PD0.8/PT0 (444 N). The maximum strengths achieved by adhesive joining include the Alteco (168, 217, 363 N), the Araldite (216, 225, 230 N), the Loctite (150, 198, 228 N), and the Weicon (169, 194, 251 N). The RS stand for the rotational speed, PD is the plunging depth, and PT is the protrusion. Further, N is a newton that shows the amount of force.

The FSW process has obtained 42% higher strength than the Alteco, and more than twice the strength of the other considered adhesives. The FSW process has also provided higher extensions values (corresponding to the maximum pull-out strength) compared to the adhesive joining cases, as shown in seen in FIG. 9B. This suggests that the FSW process provides tougher (higher strength and extension) TTJs than the adhesive joining technique.

Apart from high strength and extension, an adequate leak path is also achieved by using the FSW process. The leak path is an important property/characteristic of the shell and tube heat exchanger joints which needs to be maximized for an increased polymer barrier between the fluids of the shell and tube sides of the heat exchangers. Different conditions provided different leak path values, like RS1600/PD0.8/PT1 case has partially filled the remaining sheet thickness while RS1600/PD1/OPT has almost filled the remaining sheet thickness. The case of RS820/PD0.8/PT1 (second highest weld strength of 452 N) has also filled up to 3 mm of the remaining sheet thickness of 3.9 mm (77% filling of the remaining sheet thickness) in the clearance between the tubular member 208 and the at least one tube-sheet 202.

This case shows the potential of the FSW process to achieve both high leak path and tube pull-out toughness (strength, extension) for the thermoplastic shell and tube heat exchangers. In accordance with another advantageous embodiment of the present invention, the FSW process is successful in producing high quality and strengthened tube-to-tube-sheet thermoplastic joints. The friction stir welding process is found promising and reliable for developing tube-to-tube-sheet joints for the thermoplastic shell and tube heat exchangers. In accordance with another advantageous embodiment of the present invention, the FSW process form spot and continuous joints, provides high strength welds, consumes low energy, has less process durations, has low-cost machines required, requires no pre-welding part preparations, and no consumable materials required.

In accordance with another advantageous embodiment of the present invention, the method provides low and controlled heating with an addition of mechanical stirring during the FSW process and provides high quality joints, high strength, and high leak path.

It should be noted that the invention has been described with reference to particular embodiments and that the invention is not limited to the embodiments described herein.

Embodiments are described at least in part herein with reference to flowchart illustrations and/or block diagrams of methods, systems, and computer program products and data structures according to embodiments of the disclosure. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

The invention claimed is:

1. A method of fabricating a thermoplastic tube-to-tube-sheet joint, the method comprising:
   providing at least one thermoplastic tube-sheet having a first aperture extending therethrough and a plurality of mounting holes;
   securing the at least one thermoplastic tube-sheet to a welding fixture using a plurality of bolts inserted through the mounting holes, the welding fixture having a second aperture aligned with the first aperture such that the first aperture is positioned above the second aperture;
   inserting a thermoplastic tubular member through the first aperture and into the second aperture such that a radial clearance gap of at least 0.5 mm is maintained between an outer surface of the tubular member and an inner surface of the first aperture;

performing a friction stir welding (FSW) process at the interface between the thermoplastic tubular member and the tube-sheet such that:

frictional heat generated during the FSW process produces in situ molten thermoplastic workpiece material from the tube-sheet and/or the tubular member; and the molten thermoplastic workpiece material flows into and fills the radial clearance gap;

forming a sealed joint between the tubular member and the tube-sheet without the use of any external consumable filler material.

2. The method of fabricating the thermoplastic tube to tube-sheet joint as claimed in claim 1, wherein the tube to tube-sheet joint configuration is done for a thermoplastic material, and wherein the tubular member and the at least one tube-sheet are made of a carbon black reinforced high-density polyethylene.

3. The method of fabricating the thermoplastic tube to tube-sheet joint as claimed in claim 2, wherein the thermoplastic material configured with the tube to tube-sheet joint is substantially corrosion resistant in acidic or corrosive environments in comparison with metals.

4. The method of fabricating the thermoplastic tube to tube-sheet joint as claimed in claim 1, wherein the FSW process used for joining workpieces comprising the at least one thermoplastic tube-sheet and the thermoplastic tubular member, comprises the steps of: plunging a welding tool into the workpieces to a specified plunge depth, wherein rotation and plunging of the welding tool creates frictional heat along with plunging pressure for proper joining of the workpieces; rotating the welding tool at the plunge depth for a specific time period; maintaining the welding tool at the plunge depth for a specific time duration after the rotation is stopped; and retracting the welding tool from the workpieces when the specific time duration is over to obtain an end result, wherein the end result is the tube-to-tube-sheet joint, wherein the FSW process is performed at a rotational speed between 800 to 850 rpm, a plunging depth of 0.5 to 0.8 mm, and a protrusion of 0.5 to 0.7 mm, using a friction stir welding tool fabricated from H13 steel, comprising a tool guide and a tool shoulder designed for centering and plunging into the workpieces.

5. The method of fabricating the thermoplastic tube to tube-sheet joint as claimed in claim 4, wherein the FSW process results in formation of tube to tube-sheet joints (TTJs) which are tough with higher extensions value corresponding to maximum pull-out strength compared to adhesive joining cases and achieving an adequate leak path.

6. The method of fabricating the thermoplastic tube to tube-sheet joint as claimed in claim 5, wherein TTJs formed comprise welding parameters that lies between 800 to 850 rpm rotational speed, 0.5 to 0.8 mm plunging depth, and 0.5 to 0.7 mm protrusion.

7. The method of fabricating the thermoplastic tube to tube-sheet joint as claimed in claim 1, wherein the fabricated thermoplastic tube to tube-sheet joint is used in many apparatuses comprising a thermoplastic shell and tube heat exchanger, a thermoplastic pipe to flange joints, and a thermoplastic boiler.

8. The method of fabricating the thermoplastic tube to tube-sheet joint as claimed in claim 1, wherein the second aperture of the welding fixture is less (interference fit) than a tubular member's outer diameter for holding the thermoplastic tubular member stationary during the FSW process.

9. The method of fabricating the thermoplastic tube to tube-sheet joint as claimed in claim 1, wherein the thermoplastic tubular member and the at least one thermoplastic tube-sheet are made of a thermoplastic material.

\* \* \* \* \*